US008979001B2

(12) United States Patent
Peterson et al.

(10) Patent No.: US 8,979,001 B2
(45) Date of Patent: Mar. 17, 2015

(54) PORTABLE FLUID SPRAYER WITH FLUID CONTAINER SUPPORT FEATURES

(75) Inventors: Craig L. Peterson, Carver, MN (US); Ross D. Rossner, St. Michael, MN (US); Joseph W. Kieffer, Chanhassen, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 316 days.

(21) Appl. No.: 12/795,378

(22) Filed: Jun. 7, 2010

(65) Prior Publication Data

US 2011/0297756 A1 Dec. 8, 2011

(51) Int. Cl.
*A01G 25/09* (2006.01)
*B05B 9/01* (2006.01)
*B05B 9/04* (2006.01)
*B05B 9/043* (2006.01)

(52) U.S. Cl.
CPC ................. *B05B 9/01* (2013.01); *B05B 9/0413* (2013.01); *B05B 9/043* (2013.01)
USPC .......... 239/146; 280/47.17; 280/18; 280/651; 280/652; 248/136; 248/145.6; 248/175; 248/176.1

(58) Field of Classification Search
CPC .......... B05B 9/01; B05B 9/0413; B05B 9/043
USPC ............ 239/146; 248/136, 145.6, 175, 176.1; 280/47.17–47.18
See application file for complete search history.

(56) References Cited

U.S. PATENT DOCUMENTS 3,189,016 A * 6/1965 Corlet ............................ 126/38
4,003,504 A 1/1977 Johnson et al.
4,013,251 A 3/1977 Cleveland
4,560,127 A 12/1985 Ippolito
5,217,238 A * 6/1993 Cyphers et al. ............ 280/47.18
5,263,789 A * 11/1993 Torntore et al. ................. 404/93
5,286,045 A 2/1994 Cyphers et al.
5,441,297 A 8/1995 Krohn et al.

(Continued)

OTHER PUBLICATIONS

Graco, Electric Sprayers, http://wwwd.graco.com/Distributors/DLibrary.nsf/Files/337555/$file/337555E.pdf (accessed Mar. 31, 2010).

(Continued)

*Primary Examiner* — Len Tran
*Assistant Examiner* — Joel Zhou
(74) *Attorney, Agent, or Firm* — Christopher J. Volkmann; Kelly, Holt & Christenson, PLLC

(57) ABSTRACT

The present disclosure generally relates to fluid sprayers and more specifically, but not by limitation, to a portable airless fluid sprayer including fluid container support features configured to accommodate fluid containers of different sizes. In one example, a fluid sprayer pump assembly is provided and includes a pump assembly housing and a fluid intake conduit configured to provide a fluid path to the pump assembly housing. The fluid sprayer pump assembly also includes a frame assembly supporting the pump assembly housing and including a plurality of fluid container support features. Each of the fluid container support features is configured to accommodate a respective fluid container such that an inlet end of the fluid intake conduit is positionable within the respective fluid container. In one example, a fluid container support feature includes a fluid container holder pivotably attached to the frame assembly and movable between first and second positions.

17 Claims, 7 Drawing Sheets

(56) References Cited

U.S. PATENT DOCUMENTS

| | | | | |
|---|---|---|---|---|
| 6,250,595 | B1 | 6/2001 | Campbell | |
| 6,695,267 | B2 * | 2/2004 | Liao | 248/175 |
| 6,962,353 | B1 * | 11/2005 | Garcia | 280/47.19 |
| D580,518 | S | 11/2008 | Johnson et al. | |
| 7,963,532 | B2 * | 6/2011 | Feitel | 280/47.18 |

OTHER PUBLICATIONS

Wagner, Twin Stroke Piston Pump Owner's manual, 2005, 72 pages.
Sherwin-Williams Company, Ultimate Mx 695 Airless Paint Sprayer Owner's manual, 1997, 36 pages.

* cited by examiner

PORTABLE FLUID SPRAYER WITH FLUID CONTAINER SUPPORT FEATURES

BACKGROUND

An exemplary fluid sprayer includes a portable airless paint sprayer having a pumping unit for pumping paint supplied from a paint source, such as a paint container. In one instance, the pumping unit is driven by an electric motor to supply a flow of pressurized paint to an output nozzle or tip of a spray gun. The output nozzle or tip has a particular shape and size to generate a desired spray pattern. Other types of fluid sprayers include air-driven or air-assisted devices. For example, some types of paint sprayers employ compressed gas, usually air compressed by an air compressor or turbine, to atomize and direct paint particles onto a surface.

Many painting applications require user mobility and necessitate portability of a paint source, such as a paint container. Some application examples include, but are not limited to, painting an exterior of a building, painting interior walls and ceilings of a building, painting or staining a deck or fence, to name a few.

The discussion above is merely provided for general background information and is not intended to be used as an aid in determining the scope of the claimed subject matter.

SUMMARY

In one exemplary embodiment, a fluid sprayer pump assembly is provided and includes a pump assembly housing and a fluid intake conduit configured to provide a fluid path to the pump assembly housing. The fluid sprayer pump assembly also includes a frame assembly supporting the pump assembly housing and including a plurality of fluid container support features. Each of the fluid container support features is configured to accommodate a respective fluid container such that an inlet end of the fluid intake conduit is positionable within the respective fluid container. In one example, a fluid container support feature includes a fluid container holder pivotably attached to the frame assembly and movable between first and second positions.

In one exemplary embodiment, a frame for a fluid sprayer is provided. The frame includes a pump assembly frame, a base assembly configured to support the pump assembly frame at an elevated position above a support surface, and a fluid container support mechanism that is movable between a first position and second position in which the fluid container support mechanism is configured to receive and support a handle of a fluid container thereon.

In one exemplary embodiment, a fluid container support feature for a fluid sprayer is provided. The fluid container support feature includes a first portion configured to be pivotably attached to a frame of a fluid sprayer such that the fluid container support feature is movable with respect to the frame about a pivot axis between first and second positions. The fluid container support feature includes a second portion spaced from the first portion by a pair of arms extending between the first portion and second portion. The second portion includes a fluid container support surface configured to accommodate a fluid container.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
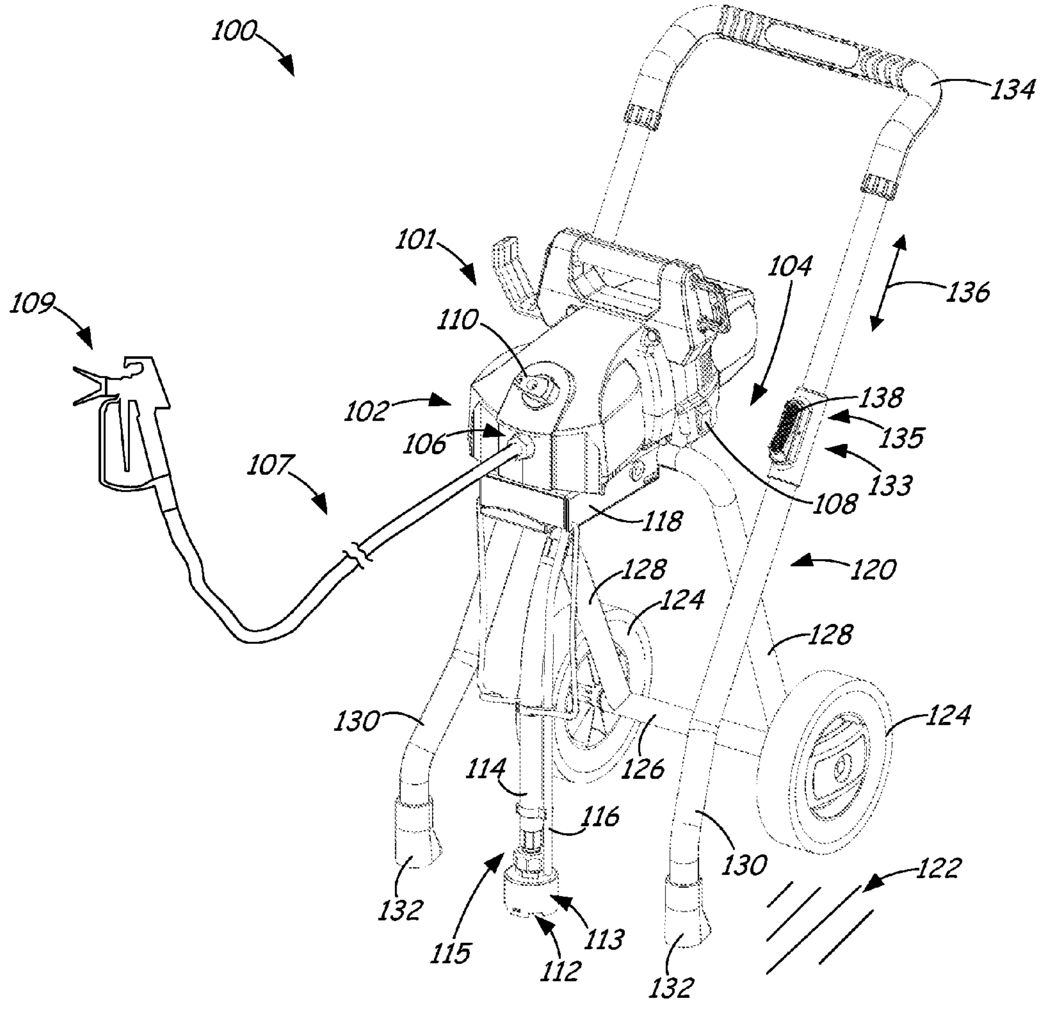
FIG. 1 is a perspective view of a fluid sprayer including a portable fluid pump assembly, under one embodiment.

FIG. 1 is a perspective view of a fluid sprayer 100 comprising a portable fluid pump assembly 101. Fluid sprayer 100 is configured to spray fluid material supplied from a fluid container (not shown in FIG. 1) through the air onto a surface. As used herein, “fluid” or “fluid material” refers to liquids for spray-coating applications such as, but not limited to, paints, varnishes, stains, inks, and the like. In the embodiment illustrated in FIG. 1, sprayer 100 comprises an airless sprayer configured to spray atomized paint. However, sprayer 100 can include other configurations and can be utilized to spray other types of fluid materials.

A housing 102 of pump assembly 101 houses an electric drive or motor operably configured to drive a fluid pump mechanism. In one embodiment, the fluid pump mechanism comprises a reciprocating piston pump that delivers pressurized paint to an output port 106. A conduit, such as a sprayer hose 107, can be connected to housing 102 at output port 106 and supply the pressurized paint to a spray gun 109, for example. Pump assembly 101 includes a power switch 108 (illustratively an on/off switch) and a pressure adjustment mechanism 110 (illustratively a rotatable dial). A power cord (not shown in FIG. 1) is configured to provide electrical power from a wall outlet, for example.

Pump assembly 101 includes a fluid intake conduit 114 and a fluid return conduit 116 (collectively referred to as conduit set 115). Fluid intake conduit 114 illustratively comprises a suction or siphon tube having an inlet end 112 positionable within the fluid container. Conduit 114 is configured to supply an inlet paint flow from the inlet end 112 to the fluid pump mechanism in housing 102. In one embodiment, a fluid filter 113 is mounted at the inlet end 112 of conduit 114. Preferably, inlet end 112 is positioned at (i.e., in contact with or spaced a small distance away from) the bottom of the fluid container. In this arrangement, conduit 114 can remove substantially all the contents of the fluid container while minimizing the possibility of air entering inlet end 112 during operation of sprayer 100. Fluid return conduit 116 illustratively comprises a return tube providing a return path from housing 102 for paint and/or air, for example during priming of the fluid pump mechanism.

Housing 102 is supported by a pump assembly frame 104 comprising a housing support assembly 118 connected to a frame base 120. Assembly 118 comprises a platform supporting housing 102 at an elevated position above a support surface 122 (such as a floor of a worksite) on which base 120 is positioned. Intake conduit 114 depends from a bottom of housing 102 and into an interior of the paint container. In the illustrated embodiment, frame base 120 includes a pair of wheels 124 connected by an axle 126. Axle 126 is mounted at ends of a pair of downwardly extending legs 128, which are attached to housing support assembly 118. In one embodiment, legs 128 are formed as separate components, each being mounted to platform 118 individually. In the illustrated embodiment, legs 128 are integral, formed of a single unitary body. In this manner, legs 128 form a support structure that is substantially U-shaped. Assembly 118 is secured to legs 128 such that the platform formed by assembly 118 is substantially parallel to support surface 122.

Frame base 120 includes a second pair of legs 130 that are connected to the first pair of legs 128. A first end 132 of each leg 130 is configured to engage surface 122. A second end 133 of each leg 130 is configured to accommodate a handle 134. In one embodiment, the second end 133 of each leg 130 comprises a handle adjustment mechanism 135 that slidably receives a portion of handle 134 therein. Handle 134 is configured to telescope from the second end 133 of legs 130 in directions 136, thereby enabling a user to adjust the height of handle 134. In one embodiment, handle adjustment mechanism 135 comprises a locking mechanism 138 that is configured to engage and secure handle 134. In one example, locking mechanism 138 comprises a spring loaded button having a pin that is selectively insertable into one of a series of holes formed in handle 134.

Figure 2:
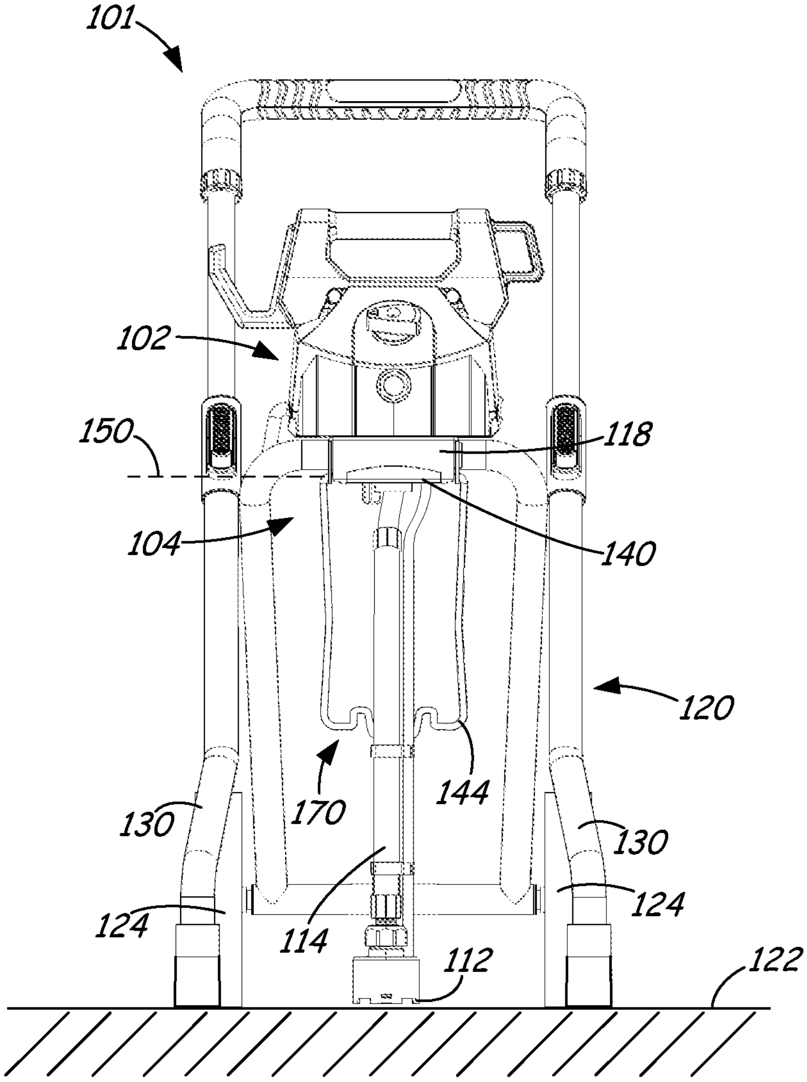
FIG. 2 is a front view of a portable fluid pump assembly including fluid container support features, under one embodiment.
Figure 3:
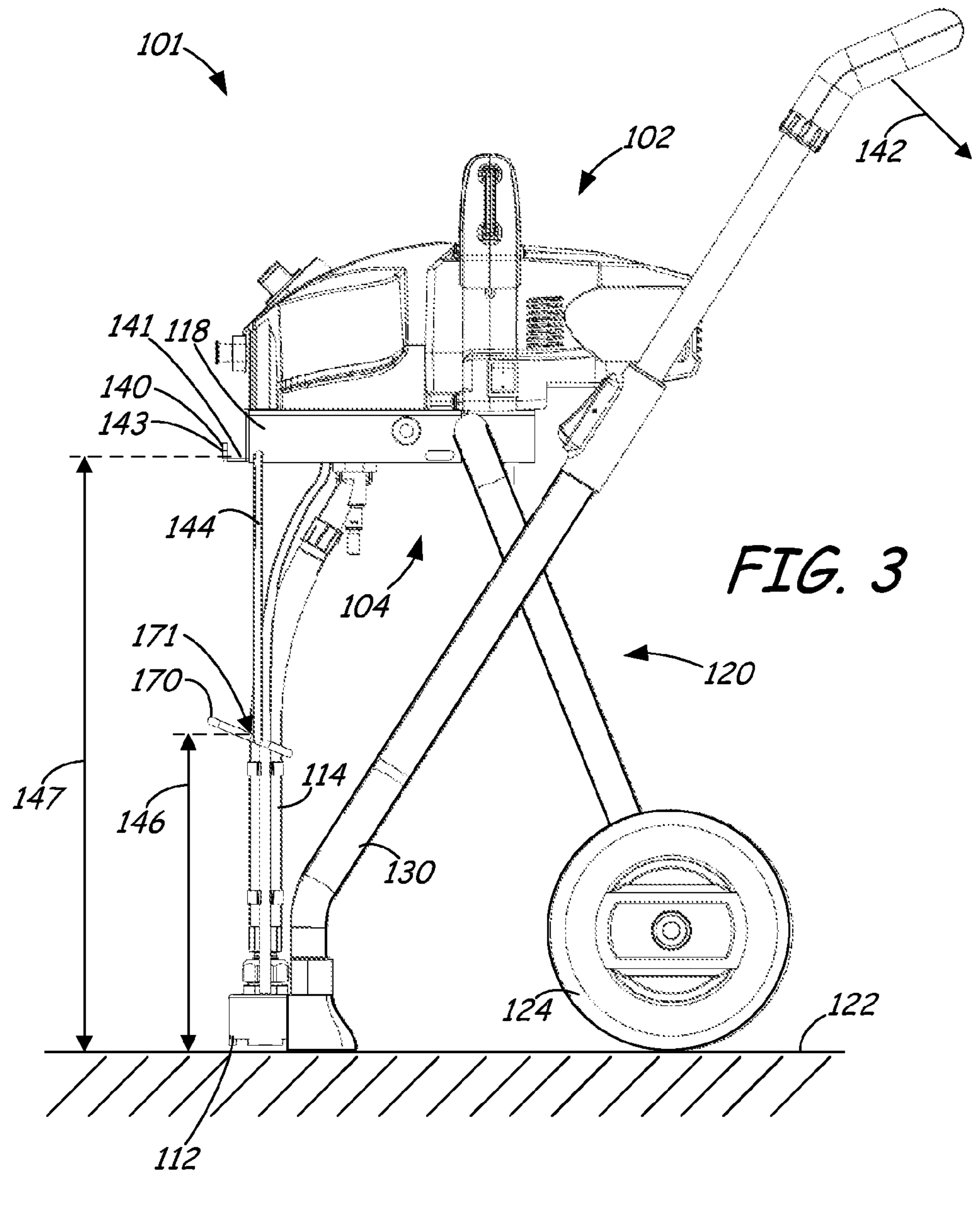
FIGS. 3 and 4 are side views of a portable fluid pump assembly including fluid container support features, under one embodiment.

FIGS. 2 and 3 are front and side views, respectively, of portable fluid pump assembly 101. As shown, housing 102 is supported on housing support assembly 118 of frame 104 at an elevated position above support surface 122. In the illustrated embodiment, a length of fluid intake conduit 114 is such that inlet end 112 is positioned in close proximity to support surface 122, when legs 130 are positioned on support surface 122. In other embodiments, the length of fluid intake conduit 114 can be longer or shorter (i.e., smaller or larger gaps between inlet end 112 and surface 122). Preferably, the length of fluid intake conduit 114 is such that inlet end 112 is positioned at the bottom of the fluid container.

Pump assembly 101 includes one or more fluid container support features configured to accommodate a fluid container under support assembly 118. For example, the fluid container support features include one or more fluid container holders each configured to suspend a fluid container from assembly 118. For instance, an exemplary fluid container holder is configured to suspend a fluid container above surface 122 when a user tilts assembly 101 backward on wheels 124 (i.e., in direction 142), for example to move assembly 101 about a worksite. This enables the user to easily transport assembly 101 without requiring the user to remove and separately carry the fluid container. Further, the one or more fluid container holders are configured such that the inlet end 112 of intake conduit 114 is positioned within the interior of the paint container proximate (i.e., near and/or in contact with) an interior bottom surface of the paint container. In one example, a height of a fluid container holder from surface 122 is such that a fluid container is suspended therefrom with a small gap between the fluid container and surface 122, when legs 130 are also supported on surface 122 (i.e., the user is not tilting assembly 101). In another example, a height of a fluid container holder from surface 122 is such that the fluid container rests on surface 122, when legs 130 are also supported on surface 122 (i.e., the user is not tilting assembly 101).

In accordance with one embodiment, assembly 101 includes a plurality of fluid container support features configured to accommodate fluid containers of different sizes. This is advantageous as it enables greater user flexibility in selecting and using paint sources (e.g., a user can use either one gallon or five gallon paint containers, for example). Because different sized containers can be utilized, the user is not required to transfer paint from one container to another, for example if paint is only available in one type of container. In contrast, when using conventional sprayers that only accommodate a single paint container size, a user must transfer (i.e., pour) paint from one container to another if the user does not have a full paint container of the correct size. This is time consuming and can result in spillage, which can result in waste and require cleanup.

Figure 8:
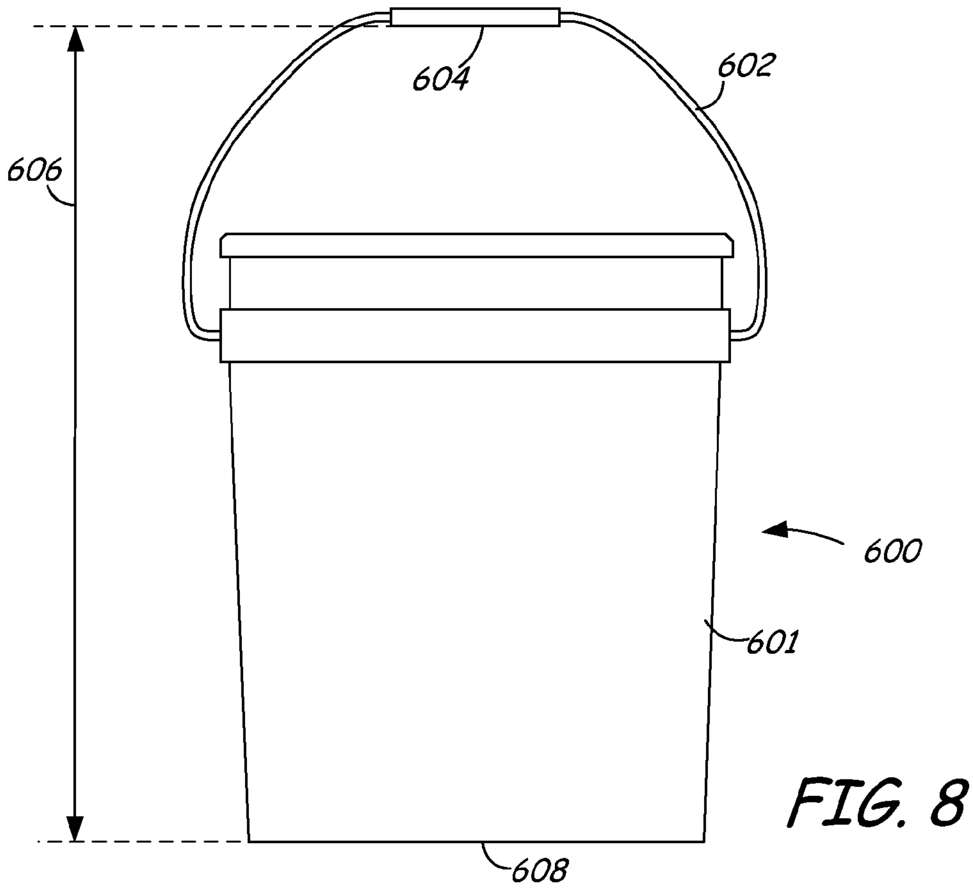
FIGS. 8 and 9 illustrate exemplary fluid containers.

Frame 104 illustratively includes a first fluid container holder 140 configured to accommodate fluid containers having a first size. In one example, holder 140 is configured to receive a fluid container having the same (or similar) dimensions to a conventional five-gallon pail such that intake conduit 114 is properly positioned in the fluid container. One example of a fluid container is illustrated in FIG. 8. As shown, fluid container 600 includes a body 601 having an interior for holding fluid (e.g., paint). A bail 602 comprises a handle 604, and is attached to and extends from body 601. Container 600 has a height 606 from a bottom surface 608 to handle 604 of bail 602. In one particular example, height 606 is approximately 20 inches. It is noted that this is one example of a container for use with container holder 140 and is not intended to limit the scope of the concepts described herein.

Referring again to FIGS. 2 and 3, in one embodiment fluid container holder 140 is rigidly attached to and extends from assembly 118. Holder 140 includes a top surface 141 configured to receive and support bail 602 of container 600 thereon. Holder 140 also includes a vertically extending portion 143 to retain bail 602 on holder 140. In one embodiment, a height 147 from surface 141 to support surface 122 is based on the height 606 of container 600 to be supported on holder 140. For example, height 147 can be the same as height 606. In another example, height 147 is slightly less than, or is slightly greater than, height 606. In one particular example, height 147 is approximately 19 to 20 inches. In this manner, when frame base 120 rests on surface 122 fluid container 600 also rests on surface 122, thereby removing some or all of the weight of container 600 from holder 140. The height of vertically extending portion 143 is sufficient to retain bail 602 on holder 140. In one embodiment, the height of portion 143 is approximately 0.5 to 1 inch. To remove container 600 from holder 140, a user lifts container 600 upwardly to lift bail 602 over portion 143.

Figure 9:
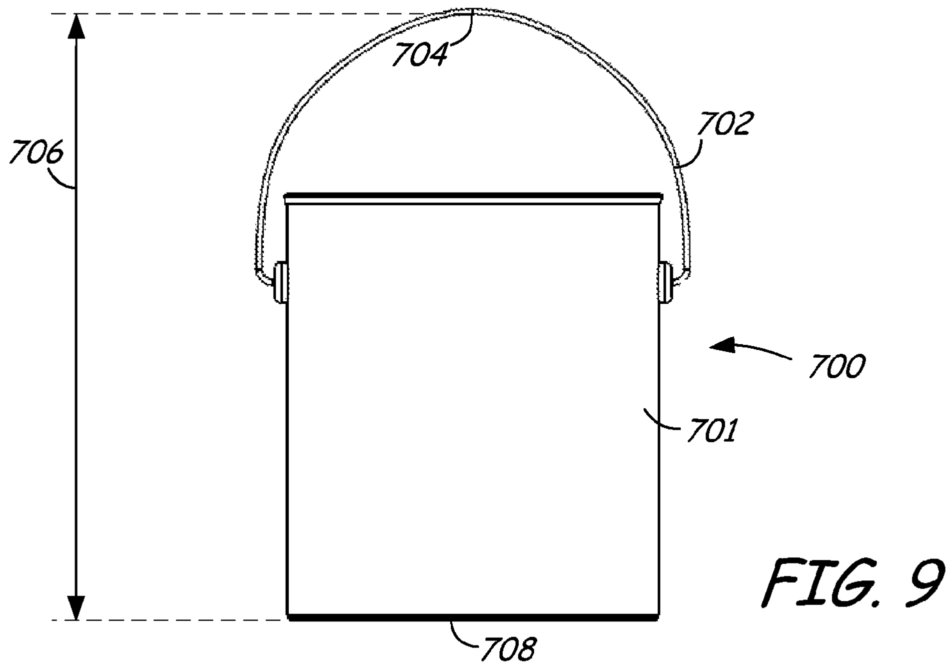

Frame 104 illustratively includes a second fluid container holder 144 configured to accommodate fluid containers having a second, different size. In one example, holder 144 is configured to receive a fluid container having the same (or similar) dimensions to a conventional one-gallon pail such that intake conduit 114 is properly positioned in the fluid container. One example of a fluid container is illustrated in FIG. 9. As shown, fluid container 700 includes a body 701 having an interior for holding fluid (e.g., paint). A bail 702 is attached to and extends from body 701. Container 700 has a height 706 from a bottom surface 708 to an apex 704 of bail 702. In one particular example, height 706 is approximately 10.75 inches. It is noted that this is one example of a container for use with container holder 144 and is not intended to limit the scope of the concepts described herein.

Referring again to FIGS. 2 and 3, fluid container holder 144 is attached to a portion of assembly 118 and includes a container engaging portion 170. A container support surface (generally represented by arrow 171) is configured to receive and support bail 702 of container 700 thereon. In one embodiment, a height 146 from surface 171 to support surface 122 is based on the height 706 of container 700 to be supported on holder 144. For example, in one embodiment, height 146 is the same as height 706. In another example, height 146 is slightly less than, or is slightly greater than, height 706. In one particular example, height 146 is approximately 10 to 10.75 inches. In this manner, when frame base 120 rests on surface 122 fluid container 700 also rests on surface 122, thereby removing some or all of the weight of container 700 from holder 144.

Figure 4:
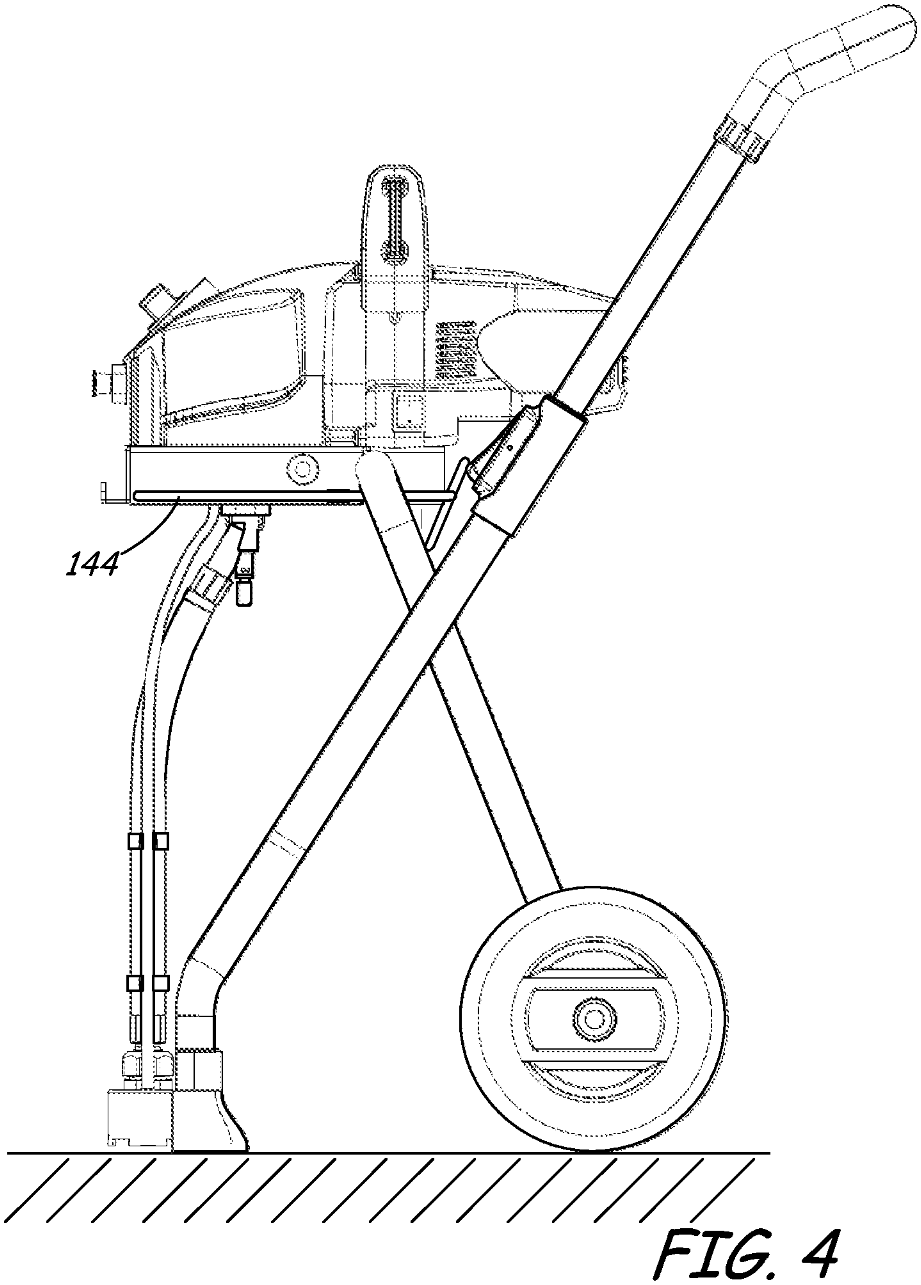

In accordance with one embodiment, container holder 144 is movable between a first, extended position (shown in FIG. 3) and a second, retracted position (shown in FIG. 4). Holder 144 is rotatably connected to a portion of assembly 118 and is configured to pivot about an axis 150 (illustrated in FIGS. 2 and 5). Further, frame 104 includes one or more locking features for retaining holder 144 in the second position. Such features include, but are not limited to, latches, hooks, notches, and/or straps.

In the first position, portion 170 of container holder 144 is positioned below assembly 118 and near and/or in contact with intake conduit 114. In the first position, container holder 144 is configured to accommodate a fluid container with fluid intake conduit 114 disposed within the fluid container. In the second position, container holder 144 of portion 170 is positioned near assembly 118 and is located away from intake conduit 114. In the second position, container holder 144 does not interfere with use of a fluid container hung from container holder 140. A user can selectively utilize fluid container holder 144 (depending on the particular fluid container size being used) by moving container holder 144 between the first and second positions.

Figure 5:
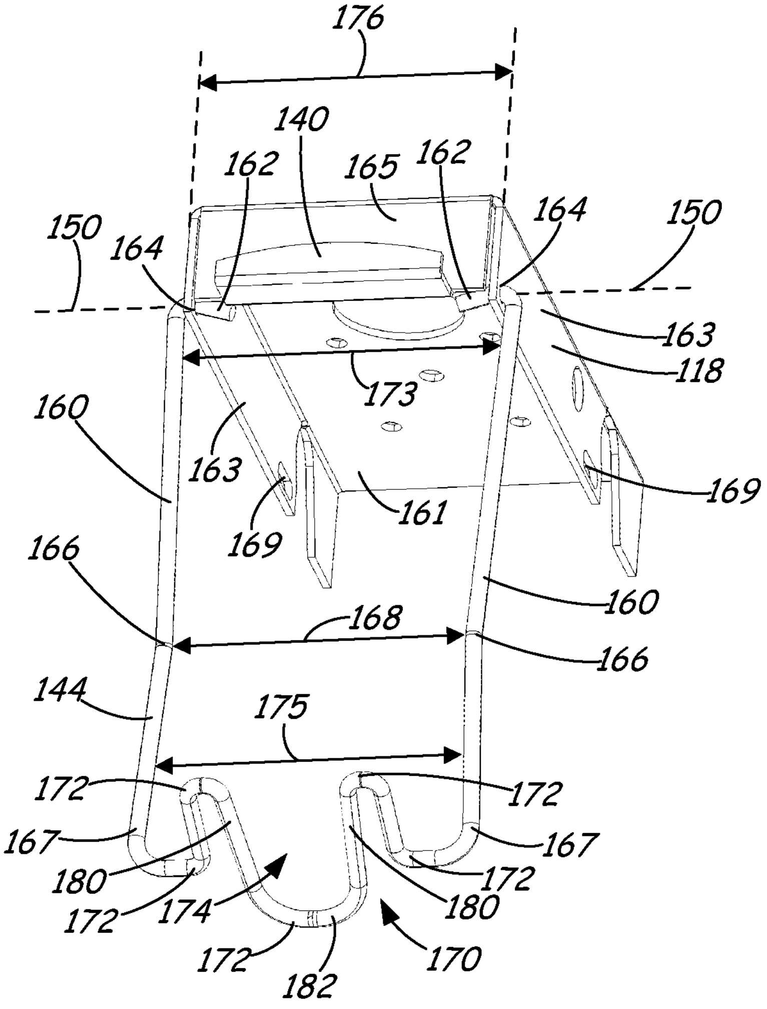
FIG. 5 is a perspective view of a fluid pump assembly frame including fluid container support features, under one embodiment.
Figure 6:
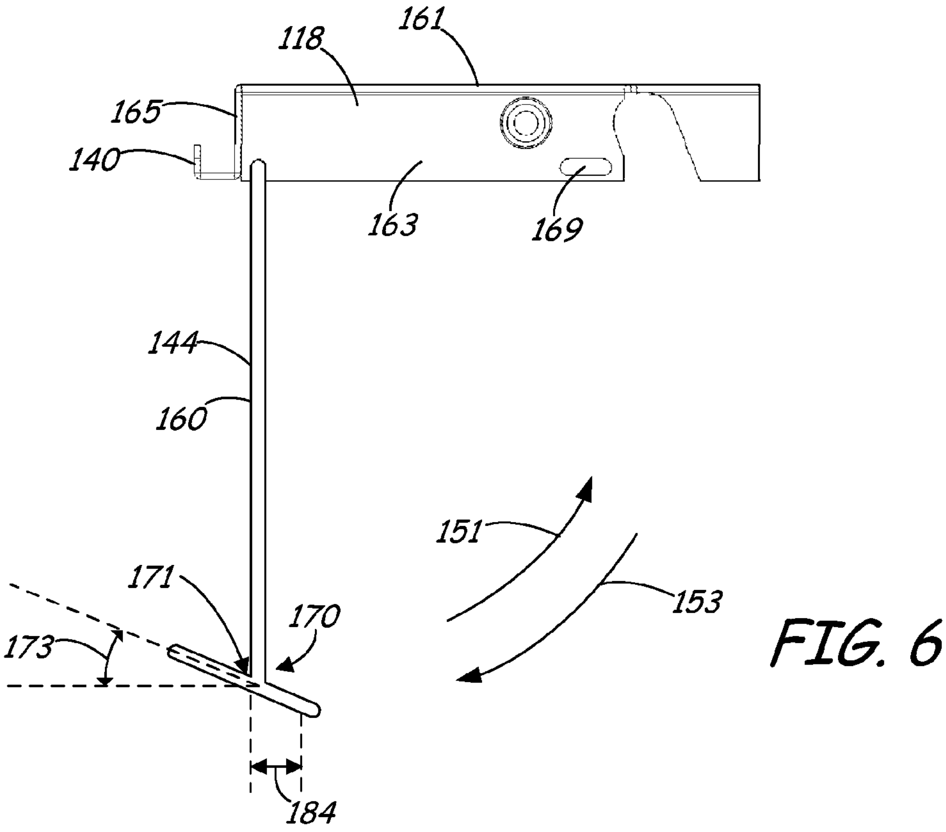
FIGS. 6 and 7 are side views of a fluid pump assembly frame including fluid container support features, under one embodiment.
Figure 7:
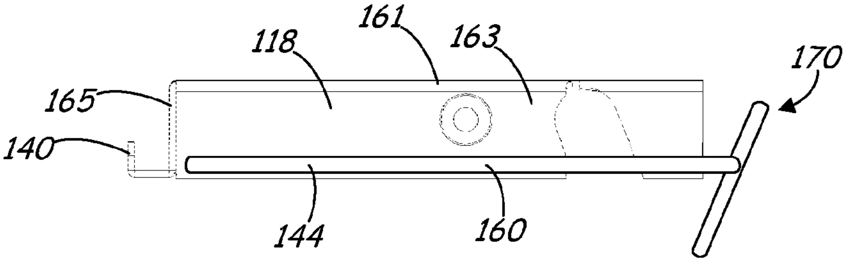

FIGS. 5-7 illustrate one embodiment of housing support assembly 118 and container holder 144. FIG. 5 is a perspective view of assembly 118 and holder 144. FIGS. 6 and 7 are side views illustrating holder 144 in an extended position and retracted position, respectively.

As illustrated, assembly 118 forms a platform having a substantially planar top portion 161 and a pair of downwardly extending sidewalls 163. Container holder 140 is attached to and extends from wall 165 of housing support assembly 118. Container holder 144 includes a pair of arms 160. A first end 162 of arms 160 are positioned through apertures 164 formed in sidewalls 163 of assembly 118, such that holder 144 is pivotable with respect to assembly 118 about axis 150. Holder 144 is configured to be pivoted about axis 150 in directions 151 and 153 (shown in FIG. 6) to move holder 144 to the retracted and extended positions, respectively.

In one embodiment, the first end 162 of each arm 160 is angled downwardly to retain the end 162 within the corresponding aperture 164 during use. Container engaging portion 170 is mounted on a second end 167 of each arm 160. In one embodiment, portion 170 and arms 160 are integral, formed of a single unitary body.

As illustrated in FIG. 5, in one embodiment, the container engaging portion 170 of holder 144 has an opening 174 formed by a plurality of curved sections 172 that is configured to accommodate conduit set 115. In one embodiment, the container engaging portion 170 has a pair of lateral support bars 180 positioned on opposing sides of conduit set 115. Conduit set 115 is supported by lateral bars 180 and a curved bar 182 that are between. In one embodiment, the curved bar 182 supports a first side of conduit set 115 and lateral bars 180 extend beyond a plain that is tangential to a second, opposite side of conduit set 115 and form the container support surface 171. In one embodiment, a distance 184 (shown in FIG. 6) between curved bar 182 and an edge of arm 160 against which a bail of a fluid container contacts when resting on support surface 171 is similar to, a width of fluid intake conduit 114. In another embodiment, distance 184 is greater than the width of conduit 184. In this manner, width 184 accommodates suction set 115 such that the bail of the fluid container does not exert a significant force against suction set 115.

As shown in FIG. 6, in the extended position container engaging portion 170 is angled upwardly to securely retain the bail (i.e., bail 704) of the container (i.e., container 700) thereon. In one embodiment, portion 170 is oriented at an angle 173 (i.e. above a horizontal plane) of approximately 20 degrees. In other embodiments, angle 173 can be greater than, or less than, approximately 20 degrees. In this manner, when the bail of the container is supported on container support surface 171 the bail also rests against arms 160.

In one embodiment, the portion of each arm 160 between the first end 162 and the second end 167 is substantially straight. In the illustrated embodiment, each arm 160 has one or more curves or bends. In this manner, a point (generally represented by reference numeral 166) along a first arm 160 between the first end 162 and second end 167 is spaced closer to the other arm 160 than other points along the first arm 160 (i.e., distance 168 is shorter than distances 173 and 175). In the illustrated embodiment, points 166 are positioned closer to the second end 167 of arms 160 than the first end 162.

When holder 144 is moved to the retracted position (shown in FIG. 7), points 166 of arms 160 are configured to engage sidewalls 163 at apertures 169. In one embodiment, a distance 176 between the outwardly facing surfaces of sidewalls 163 is greater than the distance 168 between points 166 of arms 160. Thus, the shape of arms 160 operate to retain arms 160 against sidewalls 163 and require a force exerted by the user to disengage arms from apertures 169 to move holder 144 to the extended position.

While various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. A fluid sprayer pump assembly comprising:

a pump assembly housing that houses a pump;

a fluid intake conduit having an inlet end and configured to provide a fluid path to the pump assembly housing;

a cart assembly supporting the pump assembly housing, the cart assembly having a frame, wheels and a handle for tilting and moving the frame on the wheels;

a first container holder attached to the cart assembly and configured to support a first fluid container, such that the inlet end of the fluid intake conduit is positionable within the first fluid container and the first fluid container is carried on the first container holder when the cart assembly is tilted on the wheels;

a second container holder movably attached to the cart assembly, the second container holder being movable with respect to the fluid intake conduit between a first position in which the second container holder is distal to the fluid intake conduit and a second position in which the second container holder is proximal to the fluid intake conduit, wherein, when in the second position, the second container holder is positioned in a space directly below the first container holder and is configured to support a second fluid container, such that the inlet end of the fluid intake conduit is positionable within the second fluid container, and the second fluid container is carried on the second container holder when the cart assembly is tilted on the wheels; and wherein the second container holder is pivotably attached to the cart assembly and is secured in the first position by engagement to a portion of the cart assembly.

2. The fluid sprayer pump assembly of claim 1, wherein the first container holder is configured to support a handle of the first fluid container and the second container holder is configured to support a handle of the second fluid container.

3. The fluid sprayer pump assembly of claim 2, wherein the first and second container holders are displaced at different distances from the inlet end of the fluid intake conduit.

4. The fluid sprayer pump assembly of claim 1, wherein the second container holder comprises a first end that is pivotably attached to the cart assembly and a second end comprising a support surface for receiving a bail of the second fluid container.

5. The fluid sprayer pump assembly of claim 4, wherein the second container holder comprises a pair of lateral supports positioned on opposing sides of the fluid intake conduit.

6. The fluid sprayer pump assembly of claim 1, wherein the first container holder is fixedly coupled to the cart assembly.

7. The fluid sprayer pump assembly of claim 1, wherein the second container holder has a first end pivotally coupled to the cart assembly and a second end configured to receive a bail of the second container.

8. The fluid sprayer pump assembly of claim 1, wherein the second container holder is oriented horizontally in the first position and oriented vertically in the second position.

9. A fluid sprayer pump assembly comprising:

a pump assembly housing that houses a pump;

a fluid intake conduit having an inlet end and configured to provide a fluid path to the pump assembly housing;

a cart assembly supporting the pump assembly housing, the cart assembly having a frame, wheels and a handle for tilting and moving the frame on the wheels;

a first container holder attached to the cart assembly and configured to support a first fluid container, such that the inlet end of the fluid intake conduit is positionable within the first fluid container and the first fluid container is carried on the first container holder when the cart assembly is tilted on the wheels;

a second container holder movably attached to the cart assembly, the second container holder being movable with respect to the fluid intake conduit between a first position in which the second container holder is distal to the fluid intake conduit and a second position in which the second container holder is proximal to the fluid intake conduit, wherein, when in the second position, the second container holder is positioned in a space directly below the first container holder and is configured to support a second fluid container, such that the inlet end of the fluid intake conduit is positionable within the second fluid container, and the second fluid container is carried on the second container holder when the cart assembly is tilted on the wheels; and a mechanism configured to secure the second container holder in the first position.

10. The fluid sprayer pump assembly of claim 9, wherein the mechanism comprises one or more features disposed on the cart assembly.

11. The fluid sprayer pump assembly of claim 9, wherein the cart assembly comprises a platform on which the pump assembly housing is positioned.

12. The fluid sprayer pump assembly of claim 11, wherein the second container holder is pivotably connected to the platform.

13. A fluid sprayer pump assembly comprising:

a pump assembly housing that houses a pump;

a fluid intake conduit having an inlet end and configured to provide a fluid path to the pump assembly housing;

a cart assembly supporting the pump assembly housing, the cart assembly having a frame, wheels and a handle for tilting and moving the frame on the wheels;

a first container holder attached to the cart assembly and configured to support a first fluid container, such that the inlet end of the fluid intake conduit is positionable within the first fluid container and the first fluid container is carried on the first container holder when the cart assembly is tilted on the wheels;

a second container holder movably attached to the cart assembly, the second container holder being movable with respect to the fluid intake conduit between a first position in which the second container holder is distal to the fluid intake conduit and a second position in which the second container holder is proximal to the fluid intake conduit, wherein, when in the second position, the second container holder is positioned in a space directly below the first container holder and is configured to support a second fluid container, such that the inlet end of the fluid intake conduit is positionable within the second fluid container, and the second fluid container is carried on the second container holder when the cart assembly is tilted on the wheels; and wherein the cart assembly comprises a locking mechanism configured to retain the second container holder in the first position.

14. The fluid sprayer pump assembly of claim 13, wherein the locking mechanism comprises a surface of the cart assembly configured to engage a portion of the second container holder.

15. The fluid sprayer pump assembly of claim 13, wherein the first container holder is configured to receive a handle of a five gallon paint container and to carry the five gallon paint container with the handle in a generally upright position when the cart assembly is tilted on the wheels, and the second paint container holder is configured to receive a handle of a one gallon paint container and to carry the one gallon paint container when the cart assembly is tilted on the wheels.

16. The fluid sprayer pump assembly of claim 1, wherein the first container holder comprises a hook configured to receive a bail of the first fluid container.

17. A fluid sprayer pump assembly comprising:

a pump assembly housing that houses a pump;

a fluid intake conduit having an inlet end and configured to provide a fluid path to the pump assembly housing;

a cart assembly supporting the pump assembly housing, the cart assembly having a frame, wheels and a handle for tilting and moving the frame on the wheels;

a first container holder attached to the cart assembly and configured to support a first fluid container, such that the inlet end of the fluid intake conduit is positionable within the first fluid container and the first fluid container is carried on the first container holder when the cart assembly is tilted on the wheels;

a second container holder movably attached to the cart assembly, the second container holder being movable with respect to the fluid intake conduit between a first position in which the second container holder is distal to the fluid intake conduit and a second position in which the second container holder is proximal to the fluid intake conduit, wherein, when in the second position, the second container holder is positioned in a space directly below the first container holder and is configured to support a second fluid container, such that the inlet end of the fluid intake conduit is positionable within the second fluid container, and the second fluid container is carried on the second container holder when the cart assembly is tilted on the wheels; and wherein the second container holder comprises a hook configured to receive a bail of the second fluid container.

* * * * *